(12) United States Patent
Arcaro et al.

(10) Patent No.: US 7,954,084 B2
(45) Date of Patent: May 31, 2011

(54) SOFTWARE FOR GENERATING A COMPUTER APPLICATION CODE AND SOFTWARE DESCRIPTION LANGUAGE

(75) Inventors: Stéphane Arcaro, Antony (FR); Frédéric Godefroy, Sevres (FR); Eric Mignot, Antony (FR)

(73) Assignee: Sereneo, Le Plessis Robinson (FR)

( * ) Notice: Subject to any disclaimer, the term of this patent is extended or adjusted under 35 U.S.C. 154(b) by 1705 days.

(21) Appl. No.: 10/522,790

(22) PCT Filed: Jul. 29, 2003

(86) PCT No.: PCT/EP03/09311
§ 371 (c)(1),
(2), (4) Date: Jan. 31, 2005

(87) PCT Pub. No.: WO2004/013800
PCT Pub. Date: Feb. 12, 2004

(65) Prior Publication Data
US 2005/0177817 A1   Aug. 11, 2005

(30) Foreign Application Priority Data

Jul. 30, 2002   (EP) .................................... 02291931

(51) Int. Cl.
*G06F 9/44* (2006.01)
(52) U.S. Cl. ........ 717/108; 717/104; 717/116; 717/120; 717/137
(58) Field of Classification Search .................. 717/101, 717/106, 104, 107–108, 116, 117, 137, 139; 712/E9.079; 379/9.01, 30, 31
See application file for complete search history.

(56) References Cited

U.S. PATENT DOCUMENTS

| | | | | |
|---|---|---|---|---|
| 5,499,371 A * | 3/1996 | Henninger et al. | ........... | 717/108 |
| 5,583,983 A * | 12/1996 | Schmitter | ...................... | 717/138 |
| 5,854,929 A * | 12/1998 | Van Praet et al. | ............. | 717/156 |
| 5,860,004 A * | 1/1999 | Fowlow et al. | ................ | 717/109 |
| 5,923,880 A * | 7/1999 | Rose et al. | ..................... | 717/145 |
| 5,995,730 A * | 11/1999 | Blinne | ............................. | 716/4 |
| 6,044,217 A | 3/2000 | Brealey et al. | | |
| 6,052,527 A * | 4/2000 | Delcourt et al. | .............. | 717/138 |
| 6,061,515 A * | 5/2000 | Chang et al. | .................. | 717/114 |
| 6,182,274 B1 * | 1/2001 | Lau | ................ | 717/104 |

(Continued)

OTHER PUBLICATIONS

"The Views Method and Tool", IBM Technical Disclosure Bulletin, vol. 37, No. 12, Dec. 1, 1994, pp. 645-647.

*Primary Examiner* — Tuan Q Dam
*Assistant Examiner* — Isaac T Tecklu
(74) *Attorney, Agent, or Firm* — Rothwell, Figg, Ernst & Manbeck, p.c.

(57) ABSTRACT

The software generates the computer code of at least one part of a computer application, from a description of this part of the computer application by distributing this part among several code generators according to modifiable distribution rules. Each code generator translates the part of the description that it is provided with, in order to provide at least one part of the computer code in a respective language. The invention also relates to a software description language, notably of the type of an object-oriented language for computer application modeling. The invention also relates to a software enabling to graphically or textually build a computer application model, notably a computer application human-machine interface model, and to provide a description of the model in a software description language according to the invention.

14 Claims, 2 Drawing Sheets

U.S. PATENT DOCUMENTS

| | | | |
|---|---|---|---|
| 6,199,195 B1 * | 3/2001 | Goodwin et al. | 717/104 |
| 6,275,976 B1 * | 8/2001 | Scandura | 717/120 |
| 6,389,483 B1 | 5/2002 | Larsson | |
| 6,560,774 B1 * | 5/2003 | Gordon et al. | 717/146 |
| 6,578,191 B1 * | 6/2003 | Boehme et al. | 717/107 |
| 6,742,175 B1 * | 5/2004 | Brassard | 717/107 |
| 7,197,739 B2 * | 3/2007 | Preston et al. | 717/106 |
| 2002/0046391 A1 * | 4/2002 | Ito et al. | 716/18 |
| 2002/0073330 A1 * | 6/2002 | Chandnani et al. | 713/200 |
| 2003/0056195 A1 * | 3/2003 | Hunt | 717/116 |
| 2003/0167455 A1 * | 9/2003 | Iborra et al. | 717/105 |
| 2004/0010776 A1 * | 1/2004 | Shah | 717/117 |

\* cited by examiner

SOFTWARE FOR GENERATING A COMPUTER APPLICATION CODE AND SOFTWARE DESCRIPTION LANGUAGE

CROSS REFERENCE TO RELATED APPLICATION

This application is a 35 USC §371 National Phase Entry Application from PCT/EP03/009311, filed Jul. 29, 2003, and designating the U.S.

TECHNICAL DOMAIN

The present invention concerns a software for generation of the computer code of at least one part of a computer application from a description of the said part of the computer application. The invention also concerns a software description language, notably of the type of an object-oriented language for computer application modeling.

In the present description, we use the following terms with the indicated meaning:

"computer application": designates any program or set of programs intended to operate jointly, which aim is to deliver services to their users; an application is made up of:
  its interfaces, namely, the interaction with the world exterior to the application (human users, other information systems),
  of its processing, namely its internal machinery, its algorithms,
  and of its data, namely of all its information structures stored in RAM (Random Access Memory) or on persistent support, like a hard disk.

"technical architecture": it is a matter of the set of technologies used to realize a computer application, as well as of the distribution rules enabling to assign the different parts of this application to these different technologies and of the communication modes between these technologies.

"class": designates the notion of class commonly used in modeling formalisms and object-oriented programming languages, namely the aggregation of data and processing (respectively named attributes and methods) intended to work together within a computer application.

"client": designates the user of services that it does not itself define. A client makes use of the services put at disposal by servers. By extension, we refer to client applications, client interfaces, and so on.

"source code": text written in a programming or description language which is afterwards compiled into machine language in order to be executed on a hardware computer platform, or interpreted by a software or hardware interpretation environment.

"compiled code": result of the operation of compilation of a source code.

"code": designates either source code or compiled code.

"compilation": action of translating a description expressed in a programming language into the native language of a hardware computer platform, before its execution by this hardware computer platform.

"server": designates the provider of a service. The services put at disposal by a server can be used by clients. By extension, we refer to server applications, server interfaces, and so on . . .

"inheritance": relationship linking two classes to one another, of which a first one inherits from a second one and enabling the first one to enrich the definition of the second one while retaining all the characteristics of this second class.

"interface": in a computer application, an interface is a set of exchange points which enable the application to communicate with the outer world (for instance, other applications or users), and to present services and information to it.

"HMI": means Human-Machine Interface, and is synonymous with user interface.

"user interface": in a computer application, the user interface is a specific interface: it is the part of an application specifically dedicated to the bidirectional communication between this application and its users. Thus, thanks to the HMI, the application presents the processed data and information, for instance by graphically displaying them on screen, and the user enters data and triggers actions, for instance by means of form fields, of buttons and of menus, by means of the keyboard and the mouse. These HMI are made up of components graphically imitating the appearance of real world objects that enable to recognize the corresponding displayed functions. For example, the data is often displayed and modifiable in a rectangle drawn on screen, imitating the paper form fields, likewise the actions are represented by a text in an embossed rectangular box depressing when one clicks on it, as with electrical devices buttons. The HMI is made up of a static part and of a dynamic part. The static part includes all the graphical aspects: the style and the presentation of the information. The dynamic part as for it includes everything that enables the user to control the application and to interact with it, such as the events coming from peripherals and the navigation management.

"interpretation": action of translating a description expressed in a programming language into the native language of a computer, during its execution by the computer.

"programming language": formalism enabling to describe the actions intended to be executed by a computer. These descriptions are either directly executed on the computer, when the computer native formalism is used, or executed after compilation or interpretation. A computer application is described by using one or several programming languages.

"modeling": designates the action of producing a description of an object to be realized, in order to serve as a model for its actual realization. This modeling action often consists, in computer sciences, in cutting oneself off from some considerations specific to its realization, such as the used technologies, the technical considerations, and the used programming languages. This enables to simplify the design work by reducing the number of concepts to be handled.

"abstract modeling": is the action of representing the computer applications to be realized in a formalism that is independent of technologies and of technical considerations on the basis of abstract concepts.

"software development tool": computer application enabling to build computer applications.

"technology": software element that may be a component of a realized computer application or an intermediate element of its realization process such as a tool or a programming language for instance. Under this term, we put together among others, the programming languages, as well as the software development workshops that are associated with them, the software components that can be put together in an application, the services and technical resources put at disposal by a hardware or software environment and the communication protocols between software elements.

"code generation": designates the automatic production of code for a computer application by means of a generator. It is performed using a software application description provided to the generator, and serving the purpose of driving this generation. The generator, after analyzing this description, assembles the code expected as output. This description can be expressed in a language of a higher level than the language in which the code will be produced. Thus we often make the choice of a language that is the closest possible to the natural human expression, either in graphical or textual form. Thus we can make use of the generator without having to know the formalism of the programming language used in the generated code.

"language": all the representation formats enabling to describe whole or part of the softwares in order to directly or indirectly contribute to their actual building.

PRIOR ART

Presently, the tools allowing to generate code offer this possibility for only one programming language at a time, or for a set of languages which structure and roles are predefined and fixed. This limitation is due to the fact that the code generator is explicitly linked in its very structure to this language or this set of languages. Thus, when one wishes to automatically produce code for any technical architecture comprising several programming languages, it is generally necessary to provide several descriptions at the input of several code generators. This is equivalent to manually carry out the distribution of the code on the technologies of the technical architecture. This case arises when the technical architecture of the application to be realized comprises several technologies. And this is today the most frequent case in the context of computer application development.

To carry out a code generation, the existing code generators are based on descriptions of a higher level than the level of the code to be produced. These descriptions often depend on modeling languages like UML and the said generators enable to generate the code in a given programming language. For instance, the Rational Rose® tool from the Rational company is one of the tools allowing to realize an abstract modeling of a computer application using UML.

With regard to the languages, it is possible to categorize them on a 2D diagram as shown on illustration 1. The first dimension, the vertical scale, represents the nature of technological independence of the language. It is increasing as the information depicted by the language forces less and less, due to its form, to use some or other technical or functional platform. The second dimension, the horizontal scale, represents the easiness of automatically identifying the role, the structure and the functioning of an application from its description done in a language, meaning the easiness of automatic semantic analysis of the application from its description. Put in other words, it means the easiness to convert this description in a form directly legible by man, specifying the functioning and the meaning of this application. This scale increases as languages respectively:

provide more and more numerous and rich notions with which one may describe an increasingly rich given technical or functional service using a smaller and smaller number of these notions.

force the programmer to use more and more exclusively these notions to perform this description.

The following types of languages can be distinguished:
the first generation languages: machine languages (for example: binary code x86 or 68000);
the second generation languages: symbolic languages (for example: assembler x86 or 68000);
the third generation languages: procedural languages and object-oriented languages (for example: Basic or Java);
the fourth generation languages: languages handling aggregated notions and usually assumed by dedicated computer-aided software engineering tools (for example: PowerBuilder or Windev);
the abstract modeling languages (for example: UML or Merise);
the description languages (for example: HTML, WML).

The first generation languages are the languages of the lowest level. The instructions composing them are directly understandable by a processor. They are elementary and in limited numbers. In practice, they are made of numbers (binary expressed) codifying the actions feasible by the processor internally or in interaction with its hardware environment. These languages are intimately linked to the hardware environment that is able to execute them. This technological dependency puts them at the lowest level on the technological dependency scale. In this context the automatic semantic analysis is nearly impossible due to the elementary nature of the available instructions. Indeed, the slightest operation to which a person could give a meaning unit may require several hundreds of instructions expressed in machine language. This justifies the positioning of these languages at the lowest level of the semantic analysis easiness scale.

The second generation languages appeared to enable the programmers to avoid the direct use of the binary codes of the machine languages. Instead of these codes, the programmers could make use of symbols more directly understandable by man. Nevertheless, these symbolic languages remain at the same low level as the first generation languages, and only the designation of elementary operations of the language changes its form (moving from a binary to an alphanumerical description). Indeed their formalism is the result of a direct bijection with the binary codes of the first generation languages. Therefore, as these last ones, they are ranked at the lowest level of the technological independence scale. Concerning the automatic semantic analysis, this last one is nearly impossible without having at disposal an analyzer offering an intelligence at least equal to that of the programmer who realized the description of this application in this language. Indeed, the formalism is of a such low level that the only elements which could be able to bear a piece of information of functional or technical meaning could be included in the comments. But the formalism offers no structured functional or technical context, which prevents from using them for any deterministic analysis.

The third generation languages appeared to allow to describe a computer application independently of the hardware which will make use of this description to execute the aforementioned application and to give access to basic operations which are more complex than those of the first and second generation languages. Nevertheless, even if the formalism and the syntax are abstracted from the hardware, the description possibilities offered by these languages are intimately linked to the technical environment which will be used to execute the performed description. These languages represent therefore a first improvement in technological independence allowing the programmer not to know about the way in which the elementary functions provided by the language are implemented on the target technical platform, but that doesn't exempt the programmer from arranging these elementary functions in a given way to take the specificities of this platform into account. Concerning the easiness of the automatic semantic analysis, the third generation languages represent also an improvement because they offer a structured environment for some technical or functional services notably on the structure of the algorithmic routines et on the structure of the handled data. Nevertheless, they often offer the possibility to cut oneself off from or to bypass the environment provided by them to describe a given service. However, this analysis level is not able to exceed the complexity level of the elementary functions offered by the language, and this first one is corrupted by this bypassing possibility. Therefore, in order to build up meaning units allowing to interpret the functioning of the described application, one needs a human intervention or an analysis tool based-on artificial intelligence which exceeds the current state of the art.

The fourth generation languages (4GL) are combined with tools commonly named CASE (Computer-Aided Software Engineering) tools. This merger is so strong that it is usual to equally use one or the other terms: 4GL or CASE tools. They arose from a wish for capitalization concerning the creation of technical components. These CASE tools, assuming that most of the application can be built by assembling and parameterizing generic components, offer a wide palette of pre-defined components which are just to be parameterized and to be made to communicate with one another. These CASE tools are all linked to a specific technical language, which, as the third generation languages, offer possibilities which are limited by the technical environment of execution upon which they depend. This limitation ranks these 4GL at the same level of technological independence as the third generation languages. However, concerning the easiness of automatic semantic analysis, this one is higher than all the aforementioned languages. Indeed, the CASE tools strictly impose on the programmer the structure allowing to describe a technical or functional service. The automatic semantic analysis can thus be based on a perfect determinism to detect these services, being limited by the fact that the identified service is associated with a realization specific to a unique technical platform, and is not a generic service. This analysis can thus not always assume the functional aim of the programmer, but it can always determine his technical aim.

The abstract modeling languages came to light from a wish for an application description being independent of any technological characteristic. They focused on the algorithmic and data structure aspects. They are used to develop applications in two phases: the first one deals with the design of a model and the second one with the automatic code generation in a language (most of the time a third generation language). This ability to create a model independent of the technologies for most of the services to be described in a computer application leads us to rank it higher than the other aforementioned languages on the technological independence scale. Nevertheless, in order to be able to generate a complete application, it is essential, when these tools are to be used, to include in the model links to basic elements of the third generation language which will eventually be used, and this makes the model dependent on this technology. At last, it is necessary to describe the computer application to be modeled in a specific way according to the configuration of the technical architecture, which makes the model dependent on this last one. Concerning the easiness of the automatic semantic analysis, this one is equivalent to the one obtained by making use of a third generation language because the abstract modeling languages offer a structured environment for the description of some functional services. The automatic semantic analysis of the models thus remains, due to the handling of low level and very abstract notions (class, relation, method, collaboration, . . . ), unable to automatically identify specific technical or functional complex services, without human intervention or without artificial intelligence module exceeding the present state of the art.

The description languages are based on a syntax defining in a fixed way the computer elements that can be described by using them. As the fourth generation languages, they define notions of a higher level which are intended to be assembled in order to make up a description. The object of the description is often a graphical one and is notably used in computer sciences to describe a human-machine interface. Historically, these languages were used to format text before printing or displaying on screen. The elements that they enable to describe are static. To introduce some dynamism, these language are sometimes associated with a third generation language. They are not intended to enable the production of an application. Their support is based on tools named browsers, interpreting them to perform what is called the rendering of their description, that is to say the transformation of the information included in the description language according to its specification. Concerning the technological independence, they allow in the scope of the abilities of the language to display their description on any hardware or software platform, but they impose a specific technical architecture, based on the availability of a rendering tool. On the other hand, concerning the easiness of automatic semantic analysis, this one is at the same level compared to the 4GL, because it is based, like them, on a constraining structure of predefined services, but imposing a specific technical implementation.

DESCRIPTION OF THE INVENTION

The invention aims at facilitating the development of computer applications and at enabling this development to be done faster compared to prior art. It aims also at making more reliable the developed computer application as well as the development process of the computer application. It aims at last at facilitating the re-use of developments made for a computer application, for instance for the development of another application or also for the adaptation of the computer application to a new technical architecture.

For this purpose, the present invention proposes a software for generation of the computer code of at least one part of a computer application, in which the software generates the said computer code from a description of the said part of the computer application by distributing the said description between several code generators according to modifiable distribution rules, each code generator translating the part of the said description which it is provided with, in order to provide at least one part of the said computer code into a respective language. Thus, the distribution rules may advantageously correspond to the technical architecture which will implement the computer application. Of course, it is perfectly conceivable to send a same part of the description to several different code generators, for instance if it is wished to simultaneously generate the computer code of the computer application for several different technical architectures. The dependent claims define preferred realization modes of the software according to the invention. According to another aspect, the invention proposes also a software description language, notably of the type of an object-oriented language for computer application modeling, arranged in classes enabling to define first classes giving access to technical or functional services to be provided by the hardware or software computer platform, in which the said services cannot be defined by the said the language, and the other classes cannot get access to any one of these technical or functional services except through the said first classes.

According to yet another aspect, the invention proposes a software enabling to graphically or textually build a model of a computer application, notably a model of computer application human-machine interface and to provide a description of the model into the software description language according to the invention.

Other features and advantages of the invention will be further disclosed at the perusal of the following description of a preferred realization mode of the invention, given as an example and referring to the appended drawing.

BRIEF DESCRIPTION OF THE DRAWINGS

The illustration of FIG. 1 schematically shows the positioning of the language according to the invention in comparison with the prior art in terms of description richness and of easiness of automatic semantic analysis on the one hand, and in terms of technological independence on the other hand.

The illustration of FIG. 2 shows a generic example of technical architecture.

Figure 1:
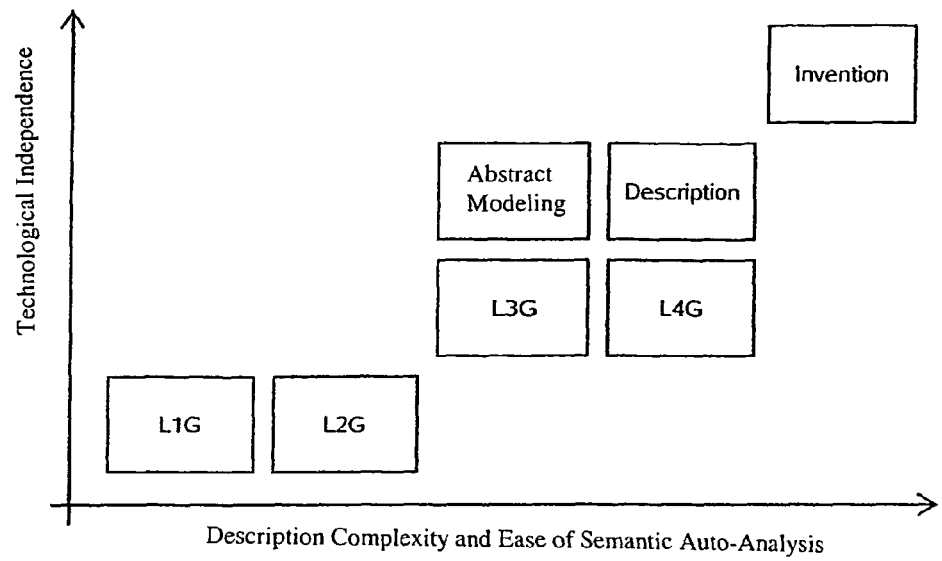
Figure 2:
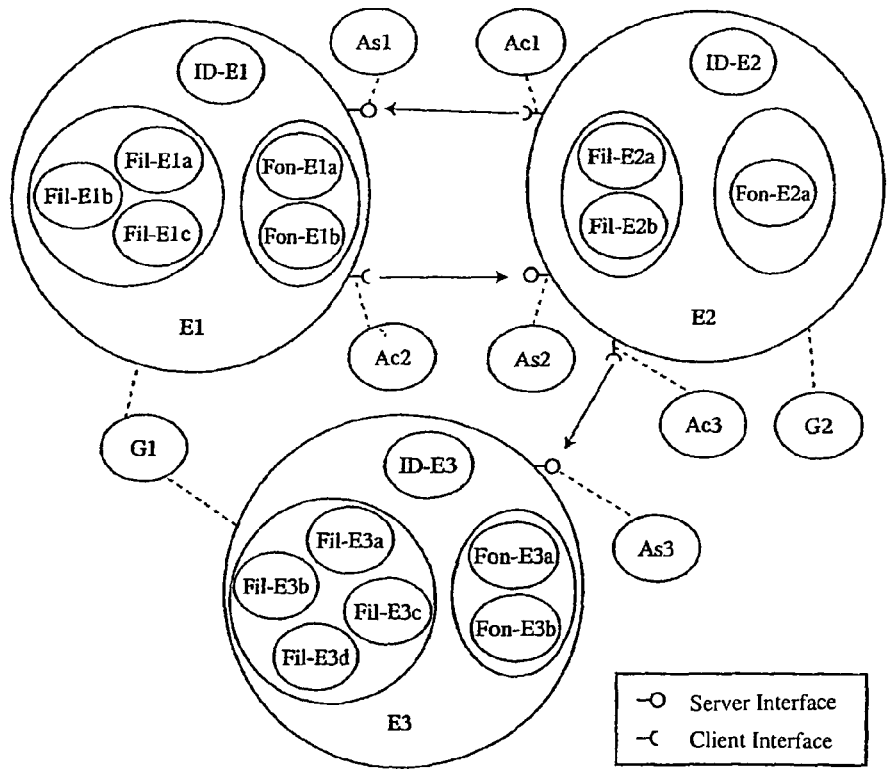
Figure 3:
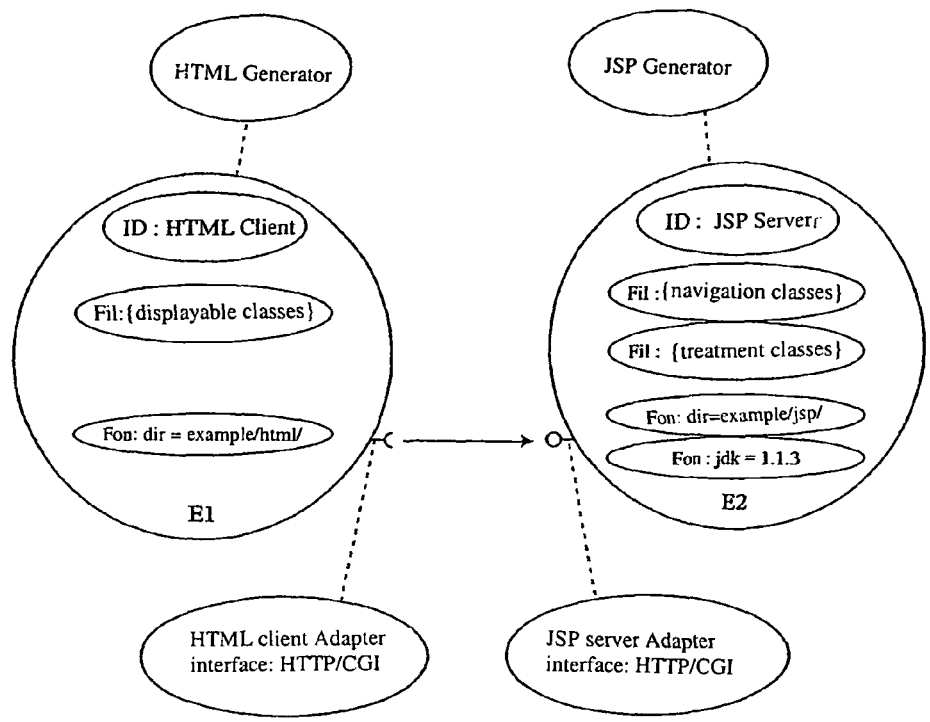
Figure 4:
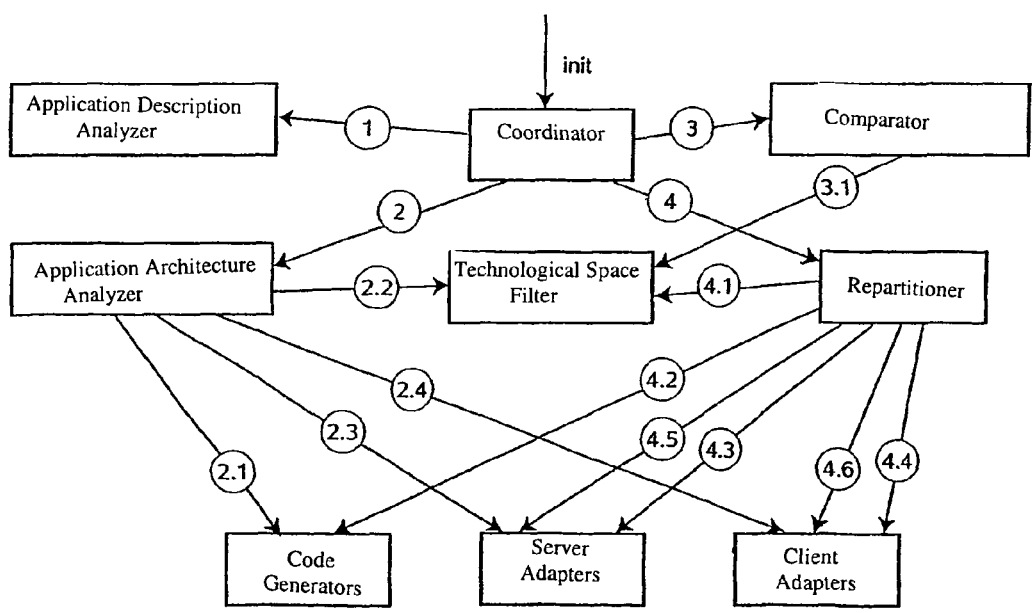

The illustration of FIG. 3 shows an example of a fragment of actual technical architecture which may be used to realize an HTML/JSP intranet application The illustration of FIG. 4 is a diagram showing the functioning of an architectural code generator according to the invention.

PREFERRED MANNERS TO REALIZE THE INVENTION

We will first describe the preferred manner to realize the code generation software according to the invention, before describing that of the software description language.
1) The Code Generation Software For convenience, we will designate henceforth the code generation software according to the invention by "architectural code generator". Indeed, we will later on refer to architectural code generation, because it is a matter of generating code for a technical architecture as a whole, namely to distribute the produced code on several technologies thanks to code generators each one responsible for a technology of the architecture.

The architectural code generation is achieved by the architectural code generator which automatically enables to analyze a computer application description, then to automatically distribute its constitutive elements, so as to generate the code thereof, according to the description of the technical architecture that defines the choices to be made to get this distribution on several code generators and adapter of interfaces between technologies, each one taking charge of a specific technology.

The architectural code generator comprises the following modules:
- an application description analyzer able to analyze software application description files expressed in an application description format,
- an architecture description analyzer able to analyze technical architecture description files in an architecture description format,
- a technological space filter,
- code generators,
- server adapters,
- client adapters,
- a comparator,
- a dispatcher,
- a coordinator.

We will successively describe each of these elements as well as the functioning of the architecture code generator.
1.1) Application Description Format This format is chosen so as to allow to describe the constituents of a computer application for which we look forward to producing the code thanks to an architectural code generator.

It can advantageously be the software description language according to the invention specifically described at section 2). Nevertheless, other formats can be used.
1.2) Application Description Analyzer The application description analyzer is intended to handle software application description files expressed in the format defined in section 1.1). It checks that the files that are passed on to it match this format and, otherwise, it issues an error.

It identifies, without loss of information necessary to the application realization, the elements, enumerated below, from these files and then extracts them thereof. These elements then constitute a split up representation of the application description intended to be passed on to other modules if the application description format requires it, external files such as libraries may be called upon to complete this analysis. An application description, done in Java for instance, uses classes of the language which definition is not part of the application description but is located in external libraries. These libraries are then used by the application description analyzer to spot the fact that the class it is analyzing is a class of the language.

The elements in question are:
A list of classes that each contains, if need be, the list of its typed attributes and the list of its methods as well as their totally defined typed signature and if need be, their definition as the sequence of commands and operations that it executes. We can possibly add to it links towards other classes from which the class in question inherits, when this notion of inheritance is being introduced.
The list of the dependencies between classes, precisely put into relation with the spot of each class where these dependencies find their origin and their target. Each dependency represents a dependency link between two different classes. In this dependency, we consider that the class that is dependent on the other is the client class. The class on which the client class is dependent is the server class.

The splitting up of the application description stemming from the extraction of these elements is expressed in a format that is internal to the architectural code generator. This format is shared by all the modules that need it.
1.3) Architecture Description Format This format is intended to describe the technical architecture on which the produced code will be distributed. This format enables to define:
technological spaces: it is about sets, each one provided with an identifier, constituted of the regrouping of the following elements:
the reference to a code generator (by its unique identifier), this generator supporting one given technology that will produce the application code for this technological space,
a functioning parameter set, namely a value list serving the purpose of parameterizing the functioning of this code generator (as defined in section 1.6),
and a set of filtering parameters, namely a list of values aimed at the technological space filter (defined in section 1.5) so as to enable this one to check whether a class (in the meaning of section 1.2) is supposed to be dealt with or not (in the meaning of section 1.10) by this technological space.

its associations between adapters and oriented dependencies between technological spaces: for each oriented dependency of one technological space on another technological space, we assign a server adapter and a client adapter. This dependency is oriented according to the direction defined by the roles in this dependency going from the space that is dependent towards the space on which it depends. In this orientation, we consider that the space that is dependent is the client space and the space on which it depends is the server space.

The diagram on the illustration 2 illustrates a generic example of technical architecture.

The above diagram shows 3 technological spaces (E1) (E2) and (E3) in which:

the (E1) space is dealt with by the (G1) code generator and is endowed with the unique identifier (ID-E1), with the functioning parameter set (Fon-E1*a*) and (Fon-E1*b*) and with the filtering parameter set (Fil-E1*a*), (Fil-E1*b*) and (Fil-E1*c*). The (E2) space is dealt with by the (G2) code generator and is endowed with the unique identifier (ID-E2), with the functioning parameter set (Fon-E2*a*) and with the filtering parameter set (Fil-E2*a*) and (Fil-E2*b*). The (E3) space is dealt with by the (G1) code generator and is endowed with the unique identifier (ID-E3), with the functioning parameter set (Fon-E3*a*) and (Fon-E3*b*) and with the filtering parameter set (Fil-E3*a*), (Fil-E3*b*), (Fil-E3*c*) and (Fil-E3*d*).

any dependency of an application element dealt with by (E2) towards an application element dealt with by (E1) is dealt with by the client adapter (Ac1) and the server adapter (As1). Any dependency of an application element dealt with by (E1) towards an application element dealt with by (E2) is dealt with by the client adapter (Ac2) and the server adapter (As2). Any dependency of an application element dealt with by (E2) towards an application element dealt with by (E3) is dealt with by the client adapter (Ac3) and the server adapter (As3).

The illustration 3 presents an example of a fragment of real technical architecture that can serve the purpose of realizing an intranet application HTML/JSP.

1.4) Architecture Description Analyzer

The architecture description analyzer handles technical architecture description files expressed in the format defined in section 1.3.

It checks that the files sent to it comply with this format, and otherwise it issues an error.

It identifies, without loss of information necessary to realize the application, the elements, enumerated below, from these files and then extracts them thereof. These elements then constitute a split up representation of the architecture description intended to be passed on to other modules. These elements in question are:

the list of technological spaces (unique identifier, code generator and parameter sets).

the list of pairs of client and server technological spaces, and their pairs of client and server associated adapters.

The splitting up of the architecture description stemming from the extraction of these elements is expressed in a format that is internal to the architectural code generator. This format is shared by all the modules that need it.

The architecture description analyzer checks that the described architecture is consistent with the abilities of the various code generators and client and server adapters mentioned therein.

it checks that the filtering parameter set of each technological space complies with the filtering parameter set of the associated code generators, relying for this checking on the services delivered by the technological spaces filter (as described in section 1.5); it checks that the mentioned client and server adapters definitely comply with the technology dealt with by the code generator of the technological space to which they are themselves associated;

it also checks that the client and server adapters comply with each other;

it can also check, if the code generator are configurable, that the functioning parameter set of each technological space of the architecture fits parameters referenced by the code generator in question.

It also checks that for a pair of two given client and server technological spaces, there is only one pair of associated client and server adapters in the architecture description. These verifications are performed so as to avoid the ambiguities of distribution of the dependencies between classes on the adapters.

1.5) Technological Spaces Filter

This module uses a filtering parameter set as the definition of a class set. For a given filtering parameter set, it determines, for any class, whether it belongs or not to the class set defined by this filtering parameter set. It finally provides two services based upon the filtering parameters sets:

the technological spaces filtering;

the checking of the inclusion of two filtering parameter sets.

The technological spaces filtering consists, from a technological space list and a class, in returning the technological spaces list for which the class in question belongs to the class set defined by the filtering parameter set associated with these technological spaces.

The notion of inclusion of two parameter sets is defined as follows: be two filtering parameter sets J1 and J2, J1 is included in J2, if, for any class C belonging to the set defined by J1, C belongs to the set defined by J2.

1.6) Code Generators

The code generators are modules of the architectural code generator that are able to produce code for a specific technology that can describe algorithms.

Their role is to produce the code corresponding to a class from the definition of this one, of its dependencies on other classes. In the case of external dependencies of a class on other classes taken charge of in the same technological space, the code corresponding to the interfaces of this class with these other classes is generated by these same code generators. In the case of external dependencies of this class on other classes taken charge of in some different technological spaces, the code of the interface of this class with these other classes is not generated, but the code generators make appear in the code of this class a mark that they choose, known as locating mark, that allows to find back the accurate location in the code where this dependency will be handled.

If the technology that they take charge of requires it, the code generators produce the necessary files to contain the produced code. In any case, they return the access references giving access to the produced code.

The code generators are endowed with a unique identifier that enables to definitely designate them in the technical architecture description.

They are intended to provide a filtering parameter set that defines the classes set (as in section 1.5) of which they can produce the code.

They optionally present a parameter list and the means to define the value of these parameters so as to qualify the hardware and software environment in which this technology is executed and therefore to define more sharply if necessary the technological space and the conditions for the code generation.

A functioning parameter can be for instance a directory in which the generated code file will be stored. Another example can be the choice of the version of the "jdk" to be used in the case of the use of a Java code generator.

1.7) Server Adapters

The server adapters enable to generate code in one or several given technological spaces. This code can be integrated into the code produced by a code generator. This code plays the role of a server interface assuming the communication between two classes involved in a dependency. This code becomes part of the code that was produced by the code generator for the server class involved in this dependency. The code produced by this server adapter will enable the code produced by the client adapter, integrated into the code that was produced by a code generator for the client class of this dependency, to interface with it.

The server adapters are endowed with a unique identifier that enables to designate them in the technical architecture description.

They point out in which interfaces category they get classed. These interfaces categories serve the purpose of determining the compatibility of these server adapters with client adapters. They are freely defined by the server adapters and can be shared by several different server adapters.

Among the interface categories that the adapters can define, one can mention for instance CORBA (r) and RMI (r).

The server adapters point out which (is)are the code generator(s) for which they are able to modify the produced code in order to insert their server interfaces code therein or to produce the interfacing code external to the code produced by this(these) code generator(s).

The server adapters produce the server interface code from a dependency, from the classes involved in this dependency and from access references to the code produced for these classes by the code generators corresponding to this dependency.

The server adapters receive preferably a signal of end of transmission of code generation request, indicating to them that they will not receive any more thereof, during the process of architectural code generation. Indeed, some technologies can require that the adapters wait for having received all the requests before starting to modify the code produced by the generators. It may occur for instance that the produced instructions must be arranged in an order that is different from the one in which they were placed in the original application description and that this order depends on the nature of all the involved instructions.

The server adapters are intended to be able to receive successively several requests of server interface code generation for several dependencies, and they choose, according to the constraints of the technologies that they make communicate and the way they make them communicate, whether they produce and insert the code of the interfaces generated as fast as these requests are received or they must wait for the end of request transmission signal issued by the dispatcher to insert this code.

1.8) Client Adapters

The client adapters enable to generate code in one or several given technological spaces. This code can be integrated into the code produced by the code generator. This code plays the role of a client interface assuming the communication between two classes involved in a dependency. This code is preferably integrated into the code that a generator produced for the client class involved in this dependency. The code produced by this client adapter interfaces itself with the code, produced by the server adapter, integrated to the code produced by the code generator for the server class of this dependency.

The client adapters are endowed with a unique identifier that enables to designate them in the technical architecture description.

They point out in which interfaces category they get classed. These interfaces categories serve the purpose of determining the compatibility of these client adapters with the server adapters. They are freely defined by the client adapters and can be shared by several different client adapters.

The client adapters point out which is(are) the code generator(s) for which they are able to modify the produced code to insert their client interface code therein or to produce interfacing code external to the code produced by this(these) code generator(s).

The client adapters must produce the client interface code from a dependency, from the classes involved in this dependency and from access references to the code produced for these classes by the code generators corresponding to this dependency. The client adapters must understand and use the locating marks left by the code generators with which they are compatible.

The client adapters must be able to receive a signal of end of transmission of code generation request, indicating them that they will not receive afterwards any more thereof along the process of architectural code generation. Indeed, some technologies may require that the adapter wait for having received all the requests before starting to modify the code produced by the generators.

The client adapters must be able to receive successively several requests of client interface code generation for several dependencies, and they choose, according to the constraints of the technologies that they make communicate and the way they make them communicate, whether they must produce and insert the code of the generated interfaces as fast as the requests are received or they must wait for the end of request transmission signal issued by the dispatcher to insert this code.

At the end of the code generation, the adapters must have made disappear from the code the locating marks that the code generator placed therein.

1.9) Comparator

The comparator checks the consistency between the code generation abilities offered by the architecture description and the requirements of the application description in terms of code generation. It therefore checks that all the classes and dependencies between the application classes are dealt with by the appropriate technological spaces and adapters. That for, the comparator notably uses the services of the technological spaces filter. It enables to check the following conditions:

for each of the classes that the application description analyzer discovered in the application description, it checks that there exists, in the technical architecture description, a technological space taking-charge of these classes;

for each dependency, defined by the described application, between a client class and a server class dealt with by different technological spaces, it checks that there exists a server adapter and a client adapter associated with each pair made up of a technological space taking charge of the client class and in a technological space taking charge of the server class.

In case of lacks in the technical architecture description compared to the requirements of the application that lead to an inability to generate its code, the comparator issues an error message communicating theses lacks.

1.10) Dispatcher

The dispatcher is in charge of distributing the classes and the dependencies of the split up representation of the application description, according to the architecture, on the different code generators and client adapters and server adapters, as set forth by the process described in section 1.12).

If the call order of the different client adapters is, not indifferent for the code generation, it determines this order and then calls the involved client adapters in that order. If the call order of the different server adapters is not indifferent for the code generation, it determines this order and then calls the involved server adapters in that order. If the call order of the different generators is not indifferent for the code generation, it determines this order and then calls the involved generators in that order.

1.11) Coordinator

The coordinator chains the calls to the different elements of the architectural code generator described above. It follows the process described in section 1.12) and it guarantees the transmission of the parameters needed for the functioning of the architectural code generator from one module to another. Lastly, it guarantees the interaction between the architectural code generator and the outer system (calling program or human user) that triggers the functioning thereof, by passing on to it the errors and the messages possibly issued by the different modules.

1.12) Functioning

We are going to describe the functioning of the architectural code generator in relation with the illustration 4 which illustrates the functioning steps.

Init step. The outer system triggers the architectural code generation via the coordinator. It sends to it the list of the application description files in the format described in section 1.1) and the list of the architecture description files in the format described in section 1.3). If we provide several files, we provide them simultaneously in case the presence of all of them is necessary to interpret the description.

Step 1. The coordinator provides the application description analyzer with the application description files expressed in the format of section 1.1). The application description analyzer analyzes these files and sends back the split up representation of the application. In case an error is issued during this step, the generation process stops.

Step 2. The coordinator provides the architecture description analyzer with the architecture description files expressed in the format of section 1.3). The architecture description analyzer analyzes these files and sends back the split up representation of the architecture. During this step, the architecture description analyzer performs the following tasks:

Step 2.1. If the code generator are configurable, the architecture description analyzer consults the code generator of each technological space to get its functioning parameter list. The architecture description analyzer then checks that the functioning parameter set of these technological spaces defines a value only for parameters of this list. In any case, it consults the code generator of each technological space to get its filtering parameter set.

Step 2.2. For each technological space, the architecture description analyzer questions the technological spaces filter and invokes the service of checking of the inclusion of two filtering parameter sets, so as to check that the filtering parameter set of the technological space is definitely included in the filtering parameter set of the generator. An error is issued otherwise.

Step 2.3. For each server adapter used in the architecture, the architecture description analyzer questions this adapter so that it returns to it the list of code generators with which it is compatible, along with the category in which it classes the interfaces it generates. The architecture description analyzer then checks that for each technological space of which the server adapter must realize the server interfaces, the code generator associated with this space is actually present in the list of code generators with which it is compatible. An error is issued otherwise.

Step 2.4. For each client adapter used in the architecture, the architecture description analyzer questions this adapter so that it returns to it the list of code generators with which it is compatible, along with the category in which it classes the interfaces it generates. The architecture description analyzer then checks that for each technological space of which the client adapter must realize the client interfaces, the code generator associated with this space is actually present in the list of code generators with which it is compatible. It also checks that the client adapter in question actually produces interfaces of the same category as the server adapter with which it is associated. An error is issued otherwise.

In case of error, the generation process stops.

Step 3. The coordinator passes on to the comparator the split up representation of the application and the split up representation of the architecture. The comparator checks that the requirements of the application in terms of code generation are dealt with by the architecture:

Step 3.1. For each class defined in the application, the comparator questions the technological spaces filter and invokes the service of technological space filtering, so as to get the list of technological spaces of the architecture that take charge of this class. The comparator then checks that for each class, this list is non empty. Otherwise, an error is issued.

The comparator then carries on with the detection of possible lacks by checking that for each dependency between two classes, the architecture defines a pair of client and server adapters for each pair of technological spaces that takes charge of the two classes of this dependency.

If the comparison ends with an error, the list of the detected lacks is passed on'to the caller and the generation process stops.

Step 4. The coordinator passes on to the dispatcher the split up representation of the application, the split up representation of the architecture. During this step, the dispatcher performs the following tasks:

Step 4.1. For each class defined in the application, the dispatcher questions the technological spaces filter and invokes the service of technological spaces filtering, so as to get the list of technological spaces of the architecture that take charge of this class.

Step 4.2. For each class and for each technological space taking charge of this class, the dispatcher regroups this class, its dependencies, while indicating to it those that correspond to dependencies on classes that are dealt with by technological spaces that are different from the considered space, and passes them on to the code generator associated with this space. The dispatcher also passes on to it the functioning parameter set that qualifies the hardware and software environment defined by this technological space.

In return, the dispatcher gets the access references to the produced source codes.

Step 4.3. The dispatcher handles each dependency of the split up representation of the application description regarding two classes that are dealt with by different technological spaces.

For each of these dependencies, the dispatcher then determines which server adapters must take charge of this dependency, according to the architecture description. For a dependency between a client class and a server class, the server adapters in question are those which are associated with a dependency between the technological spaces that have taken charge of the server class and the technological spaces that have taken charge of the client class.

For each of these dependencies, the dispatcher then passes on this dependency, along with the classes involved in this dependency and the access references to the source codes associated with these classes, to these server adapters.

Step 4.4. The dispatcher handles each dependency of the split up representation of the application description regarding two classes that are dealt with by different technological spaces.

For each of these dependencies, the dispatcher then determines which client adapters must take charge of this dependency, according to the architecture description. For a dependency between a client class and a server class, the client adapters in question are those which are associated with a dependency between the technological spaces that have taken charge of the server class and the technological spaces that have taken charge of the client class.

For each of these dependencies, the dispatcher then passes on this dependency, along with the classes involved in this dependency and the access references to the source code associated with these classes, to these client adapters.

Step 4.5. The dispatcher calls each server adapter that has been appealed to during step 4.3 and sends to it the signal of end of request transmission. This call is performed in the required order when necessary, as the dispatcher determines it.

Step 4.6. The dispatcher calls each client adapter that has been appealed to during step 4.4 and sends to it the signal of end of request transmission. This call is performed in the required order when necessary, as the dispatcher determines it.

In case of error, the generation process stops.

2) The Software Description Language 2.1) Qualification of the Language According to the Invention.

The invention is considered as part of a software description language. It enables this language to describe a software, whether existing or in pending elaboration, without this description containing any information related to the practical or technological realization of this software (namely without dependency on the specific abilities of a programming language, of a hardware or software computer platform, or more generally of a specific technology) but by describing its functioning in a concrete manner. The concrete description of the functioning is realized thanks to the putting at disposal through the language of concrete notions related to the practical computer-based implementation of the applications. These notions are intended to serve as a basis for the application description. The exploitation of these notions and the clarification of their functioning and of their role may rely upon their association with a functional and technical specification expressed in a language, that can even be a natural language such as French, which does not make assumptions about the technologies used to realize it. Let us mention as an example such notions as those of graphical component, of peripheral event, of data checking based on an input in the human-machine interface, of navigation, of information storage, of information search request in an information storage structure, and so on.

The absence, in the descriptions made with the help of a language endowed with the invention, of any information related to the practical and technical implementation of the described application ranks this language, in the language ranking diagram of the illustration 1, above the abstract modeling languages. Indeed, its technological independence level is superior since it does not suffer any of their limitations described in the section dedicated to the prior art.

Concerning the horizontal scale of the diagram in the illustration 1, the language according to the invention is located to the right of the fourth generation languages. Indeed, if, just like them, the automatic semantic analysis can rely upon the insurance of the use, by the programmer, of a strict frame during the modeling of a given technical or functional service, the richness of the elements available to describe a computer application is superior because it is made independent of a specific implementation and it focuses on the description of the delivered service.

2.2) Structure of the Language According to the Invention
2.2.1) Context

The invention relies upon a software description language, that is to say that it enables to realize a representation of a software application partly or as a whole. The considered language enables to define classes known as standard classes.

This language can define elementary operations enabling to describe algorithms.

This language may support inheritance, namely the ability to define classes enriching other classes. In case it supports inheritance, the language may possibly define abstract classes, namely classes that one cannot instantiate into objects and of which certain methods can be abstract, namely methods which behavior is not defined but will have to be defined by non abstract classes that inherit from these abstract classes. The language possibly enables to define the scope of the attributes, the methods and the classes, namely the access ability of the other classes to these different elements according to their relative location. This language possibly supports polymorphism, namely the ability to handle an instance of a B class inheriting from an A class as if it was an instance of the A class and, during calls to the methods of this instance handled as an A class instance, to use the implementation defined in the B class in place of the implementation defined in the A class. The lexicon and the syntax of this language are indifferent, as long as they respect the constraints set forth in the previous paragraph. This language may possibly define primitive types (for instance, the booleans or the integers) which are not necessarily classes, and in that case, possibly define elementary operation enabling to handle these primitive types.

The language is defined by a specification that determines precisely these elements as a whole and their conditions of use (lexicon and syntax, and if need be, inheritance, polymorphism, abstract classes, scope, primitive types, elementary operations).

Finally, the language, as it is defined until now, does not provide and must not provide access means to technical or functional services that can be delivered by any hardware or software platform liable to accept a software modeled with the help of this language, except the elementary operations mentioned above. As an example of these services to which the language must not give access to at this point, let us mention: the ability to display information on a printing or display device, the reception of events emitted by a command peripheral: such as the keyboard or the mouse, the communication with an information storage service, . . . .

2.2.2) The Invention

The invention consists in:
  enriching the lexicon and the syntax of the language so as to endow it with a description format specific to classes known as fundamental classes.
  and optionally associating with this language a definition technique for these fundamental classes.

These classes are said to be fundamental, because they give, to other classes which use them, an access to fundamental technical and functional services, namely services that are not directly born by these fundamental classes through a definition expressed by mean of the language itself. On the contrary to standard classes, the relation between the fundamental classes and their definition is external to the language. It totally depends on an outer interpretation, for instance by the tools using this inventions, based upon a definition external to the fundamental classes.

The format of description of the fundamental classes, integrated to the language, enables:
1—to always be able to identify a fundamental class as such,
2—to always be able to distinguish a fundamental class from a standard class,
3—to define its unique identifier,
4—to define its attributes, which cannot have a scope making them invisible to any other class if the language includes the definition of the scope,
5—to define methods said to be fundamental without specifying the functioning thereof, which are non abstract by nature, in case the abstract classes are supported, and which cannot have a scope making them invisible to any other class if the language provides the definition of the scope. These fundamental methods are methods which definition is limited to the signatures alone, but which functioning is not expressed thanks to the language itself, and must yet be considered as defined by any system exploiting this language.

The technique of definition of the fundamental classes forces, for a fundamental class, to provide:
1—its description thanks to the language as enriched above by the fundamental classes description format,
2—If inheritance is supported, and in that case optionally, a lexicon and a syntax, compatible with the language, specific to this class, defining the format used in the language to describe the classes inheriting from this class,
3—if the invention makes provision for it, the comprehensive functional and technical specification of the services delivered by this class, expressed in a language independent of the implementation technologies, which can even be a natural language such as French. This specification must not assume the technologies used to realize it. This specification must clarify the functioning of all the fundamental methods of this class (see the last dash of the section above dedicated to the fundamental classes description format). To summarize, it is about the complete semantics of items 1 and 2 of this technique. This specification will possibly be translated in the languages of the persons liable to realize the tools taking charge of this class, with, for each version, the reference of the language being based for that matter upon a defined system for language identification.

The functioning of these fundamental classes is therefore not explicitly defined, in an algorithmic manner, by using the language itself, but may rather be defined only by this functional or technical specification expressed in a language that is independent of the implementation technologies, such as a natural language as French for instance.

What is more, due to the absence exposed in section 2.2.1) of any access mean to functional or technical services that could be provided by any hardware or software platform, only the fundamental classes are liable to give access to these services.

The fundamental classes are themselves subject to the laws of inheritance if this one is present in the language. In that case, one can make a fundamental class inherit from a standard or fundamental class, in the same way that one can make a standard class inherit from a standard or fundamental class.

2.3) Functioning

Functioning of the fundamental classes. The implementation of the fundamental classes specifications is therefore fully up to the tools that exploit the language according to the invention. These are these tools that realize or simulate the functioning of these classes, depending on the needs.

Responsibility for the functioning of the fundamental classes. The tools that use or enable to carry out an application description with a language according to the invention and depending on fundamental classes, must thus be designed in such a way that they take the specifications of these fundamental classes into account when they have to interpret them. The interpretation of the role of these fundamental classes by the tools therefore relies upon the compliance of these tools with the specification of these fundamental classes.

Possible integration of fundamental classes into a language. A language according to the invention can possibly integrate, in its specification itself, a set of these fundamental classes (in that case non modifiable by the user of the language) which, once specified according to the technique described in section 2.2.2, enable the software description made thanks to this language and exploiting these fundamental classes to make these softwares rely upon the services of these fundamental classes.

Extension of a Language by Fundamental Classes During its Use.

The fundamental classes definition technique can also be made available to users of the language to extend the capabilities of the language beyond its specifications by adding new fundamental classes therein to the fundamental classes that are possibly provided along with the language. In that case, it will be preferable to endow the tools exploiting this language with an extension mechanism enabling the users who define these new fundamental classes to enrich the functioning of these tools with the help of additional modules so that these tools may take these fundamental classes into account within the scope of their functioning compliantly with the specification of these classes.

Interest for the automatic semantic analysis. The tools which will enable to analyze the descriptions made thanks to a language endowed with this invention will be able to identify the functional or technical services with the only identification of the use of the fundamental classes in the application description. This analysis will then be made without any ambiguity. Indeed, the ability of an analysis tool to provide with an automatic semantic analysis of these descriptions only relies upon the knowledge, by the developer of this tool, of the fundamental classes specifications, and not on the deduction of the role of the used classes by the algorithmic analysis of the definition of the classes described with the help of the language, something that is impossible nowadays without human intervention.

Notion of exclusive definition and reinforcement method. Within the scope of a language according to the invention, the exclusivity, owned by the fundamental classes, of providing a given hardware or software service relying upon the specificities of the platform receiving the described software, is guaranteed by the absence of theses services in the definition of the language itself. However, for the purely algorithmic services, this exclusivity is not guaranteed by the language, because it allows the description of algorithms, and this exclusivity will therefore rely on an external constraint. This exclusivity is the guarantee of the full determinism of the automatic semantic analysis. To ensure it, we will design tools producing the software descriptions described thanks to a language endowed with this invention, so that it is impossible to use the language to describe algorithms in specific cases dealt with by fundamental classes giving access to specific algorithmic services.

Applying to the code generation. Among the possible applications of the automatic semantic analysis enabled by the invention, one can mention the code generation towards distributed technical architectures which notably enables a software described with the help of a language endowed with this invention to be ported towards any technical architecture providing the services described by the fundamental classes used in the software description. Particularly, a language according to the invention can advantageously be used with a code generation software according to the invention as of the type described in section 1) of the present description.

Of course, the present invention is not limited to the examples and to the realization manner described and represented, but it is liable to many variant accessible to the man of the art.

The code generation software as well as the software description language according to the invention provide with a gain of productivity of the development of computer application estimated to close to 70% by automating a certain number of programming tasks. The invention also grants a freedom without equivalent when it comes to the technologies used during the development process. The technologies are a major source of risks and uncertainties in the software projects. This freedom therefore results in a decrease of the risks of failure and a better respect of budgets and deadlines. The fact of defining only a technology independent application model offers several advantages. We first do not have to consider technical constraints during the modeling, which simplifies this one. Then, this enables to get a model that is closer to the expectations of the users as it is not corrupted by questions that have nothing to do with functional aspects. For that reason the design phase converges more quickly towards the desired result. What is more, there is no other task to perform apart from the realization of this model. Indeed, we can get the technically fully realized application without human intervention other than the indispensable technical design. This is possible because we can automatically produce the programming code from the model that contains all the information necessary to describe the application.

Besides, the invention improves the reliability on two sides: the reliability of the obtained computer application and the reliability of the forecasts of projects progress. As far as computer applications are concerned, they can automatically be realized by the code generation software and they do not include any error other than those introduced by the functional design, and than those introduced by the code generator themselves. We can reasonably start off by assuming that these last ones will be less numerous that those introduced by a human programmer because the programming patterns used can get into their stride through a very important number of projects. And they are liable to incremental corrections and improvements along the life of the product, which will allow to capitalize on the progresses in terms of quality. As for the errors introduced by the functional design, the models produced while applying the invention being more simple to validate, one can estimate that they will be less numerous.

As far as the progress of the projects are concerned, one must notice that, in numerous projects, the technical aspects introduce unexpected realization difficulties and that some architecture choices are found to be disastrous with use for the respect of deadlines and budgets. Until now we often were forced to be subjected to them, because it was too late to reconsider that type of choice. Thanks to the invention, the technical constraints are assumed by the code generators, and the architecture choices can be revised. The proceeding of the projects will therefore suffer less shocks and will deviate less from the forecasts. Lastly another element maybe even more important that periodically comes to disturb the proceeding of the projects, is the modification of the functional specifications during the project. This is an almost systematic event and that has heavy consequences on the projects in terms of workload. This disadvantage can be avoided because it has no more impact in terms of workload other than the redefinition of the model thanks to the invention, and the technical transcription of these modification has an almost null cost as seen before. As the functional specifications are validated by the users from the model simulation, the modifications should in addition be less frequent because a real life validation is more reliable than a diagram-based or prototype-based validation.

Another advantage of the invention is the possibility to reuse the developments. This possibility stemming from the independence of the technologies, enables to capitalize within the project or between projects having functional elements in common. This notably decreases the development cost and increases the relevance of the produced applications by the cross validation they are subjected to. In the long run this reuse ability results in the possibility to realize a porting of the application. This enables to migrate an application towards a new technical architecture, when this happens to be necessary, without any important additional cost.

The invention claimed is:

1. A non-transitory computer-readable medium encoded with instructions for generation of a computer code of at least one part of a computer application, said instructions, when executed by a computer, cause the computer to:
  generate said computer code from a description of said at least one part of the computer application by distributing said description between several code generators according to modifiable distribution rules, each code generator translating the part of said description that it is provided with, in order to provide at least one part of the said computer code in a respective language; and
  split up said description in object classes and distribute said object classes between the code generators according to said distribution rules, each code generator translating the object classes with which it is provided, into said corresponding part of the said computer code.

2. The non-transitory computer-readable medium encoded with instructions according to claim 1, said instructions, when executed by the computer, further cause the computer to split up said description in dependencies between said object classes, and in the case of a dependency between two object classes each translated by a different code generator, said instructions cause the computer to make said dependency be handled by two adapters that each translate it into a computer code for interfacing the computer codes produced by said code generators for said two object classes.

3. The non-transitory computer-readable medium encoded with instructions according to claim 2, wherein each of the two adapters produce said respective interfacing computer code for a respective object class among said two object classes.

4. The non-transitory computer-readable medium encoded with instructions according to claim 3, wherein each of the two adapters inserts the respective interfacing computer code into the computer code produced by one of said code generators for said object class for which the adapter has produced said interfacing computer code.

5. The non-transitory computer-readable medium encoded with instructions according to claim 4, wherein said two adapters having to handle the dependency are chosen following assignment rules associating, for the orientation of the dependency of said two object classes, an adapter corresponding to each of the code generators translating said two object classes, the said assignment rules being modifiable.

6. The non-transitory computer-readable medium encoded with instructions according to claim 2, wherein said two adapters having to handle the dependency are chosen following assignment rules associating, for the orientation of the dependency of said two object classes, an adapter corresponding to each of the code generators translating said two object classes, said assignment rules being modifiable.

7. The non-transitory computer-readable medium encoded with instructions according to the claim 6, said instructions, when executed by the computer, cause the computer to generate said computer code from said description made in a language organized in object classes, in which said language enables to define first classes giving access to technical or functional services to be provided by a hardware and software computer platform receiving the computer application, said services being not definable by said language, and the other classes of said language cannot have access to any one of said services except through said first classes and wherein said instructions cause the computer to split said description in dependencies between said object classes from dependencies between said first classes or other classes of said language.

8. The non-transitory computer-readable medium encoded with instructions according to the claim 6, said instructions, when executed by the computer, cause the computer to generate said computer code from said description made in a language organized in object classes, in which said language enables to define first classes giving access to technical or functional services to be provided by a hardware and software computer platform receiving the computer application, said services being not definable by said language, and the other classes of said language cannot have access to any one of said services except through said first classes,
wherein said instructions, when executed by the computer, cause the computer to distribute said description between the code generators according to distribution rules associating at least some of said first classes or of said other classes of said language with at least one of said code generators, and
wherein said instructions, when executed by the computer, cause the computer to split up said description in dependencies between said object classes from dependencies between said first classes or other classes of said language.

9. The computer-readable non-transitory medium encoded with instructions according to the claim 6, said instructions, when executed by the computer, cause the computer to generate said computer code from said description made in a language organized in object classes, in which said language enables to define first classes giving access to technical or functional services to be provided by a hardware and software computer platform receiving the computer application, said services being not definable by said language, and the other classes of said language cannot have access to any one of said services except through said first classes,
wherein said instructions, when executed by the computer, cause the computer to split up said description into first classes or into other classes of said language,
wherein said instructions, when executed by the computer, cause the computer to further split up said description in dependencies between said object classes from dependencies between said first classes or other classes of said language, and
wherein said instructions, when executed by the computer, cause the computer to distribute said description between the code generators according to distribution rules associating at least some of said first classes or of said other classes of said language with at least one of said code generators.

10. The non-transitory computer-readable medium encoded with instructions according to claim 3, wherein said two adapters having to handle the dependency are chosen following assignment rules associating, for the orientation of the dependency of said two object classes, an adapter corresponding to each of the code generators translating said two object classes, said assignment rules being modifiable.

11. The non-transitory computer-readable medium encoded with instructions according to claim 1, said instructions, when executed by the computer, cause the computer to generate said computer code from said description made in a language organized in object classes, in which said language enables to define first classes giving access to technical or functional services to be provided by a hardware and software computer platform receiving the computer application, said services being not definable by said language, and the other classes of said language cannot have access to any one of said services except through said first classes.

12. The non-transitory computer-readable medium encoded with instructions according to the claim 11, said instructions, when executed by the computer, cause the computer to distribute said description between the code generators according to distribution rules associating at least some of said first classes or of said other classes of said language with at least one of said code generators.

13. The non-transitory computer-readable medium encoded with instructions according to claim 12, said instructions, when executed by the computer, cause the computer to split up said description in object classes, and to distribute said object classes between the code generators according to said distribution rules, each code generator translating the objects classes that it is provided with, into said corresponding part of said computer code and wherein said instructions cause the computer to split said description into first classes or into other classes of said language.

14. A random access memory (RAM) or a hard disk encoded with instructions for generation of a computer code of at least one part of a computer application, said instructions, when executed by a computer, cause the computer to:
generate said computer code from a description of said at least one part of the computer application by distributing said description between several code generators according to modifiable distribution rules, each code generator translating the part of said description that it is provided with, in order to provide at least one part of the said computer code in a respective language; and
split up said description in object classes and distribute said object classes between the code generators according to said distribution rules, each code generator translating the object classes with which it is provided, into said corresponding part of the said computer code.

* * * * *